United States Patent [19]

Ikemoto

[11] Patent Number: 4,708,026
[45] Date of Patent: Nov. 24, 1987

[54] POWER TRANSMISSION WITH ANCILLARY CHANGE-SPEED MECHANISM FOR EXTRA-LOW-SPEED GEAR TRAIN

[75] Inventor: Kazuhito Ikemoto, Toyota, Japan

[73] Assignee: Toyota Jidosha Kabushiki Kaisha, Toyota, Japan

[21] Appl. No.: 873,707

[22] Filed: Jun. 12, 1986

[30] Foreign Application Priority Data

Jun. 12, 1985 [JP] Japan .................. 60-127583

[51] Int. Cl.$^4$ ............................................. F16H 3/08
[52] U.S. Cl. ........................................ 74/359; 74/331
[58] Field of Search .............. 74/331, 333, 358, 359, 74/360

[56] References Cited

U.S. PATENT DOCUMENTS

| | | | |
|---|---|---|---|
| 3,589,483 | 6/1971 | Smith | 74/331 X |
| 4,038,882 | 8/1977 | Keller | 74/331 |
| 4,226,135 | 10/1980 | Winter | 74/360 X |
| 4,377,093 | 3/1983 | Janson | 74/359 X |
| 4,570,503 | 2/1986 | Theobald | 74/360 |

FOREIGN PATENT DOCUMENTS

| | | | |
|---|---|---|---|
| 1265591 | 4/1968 | Fed. Rep. of Germany | 74/360 |
| 87137 | 1/1965 | France | |
| 59-133850 | 1/1984 | Japan | |
| 2024125 | 1/1980 | United Kingdom | |
| 2133845 | 8/1984 | United Kingdom | |

Primary Examiner—Leslie Braun
Assistant Examiner—D Wright
Attorney, Agent, or Firm—Oblon, Fisher, Spivak, McClelland, & Maier

[57] ABSTRACT

A power transmission includes a housing formed to contain a main change-speed mechanism and an ancillary change-speed mechanism. The main change-speed mechanism includes input and output shafts arranged in parallel with each other and rotatably mounted within the housing, and a first drive gear mounted on the input shaft for rotation therewith, a second drive gear rotatably mounted on the input shaft, a first driven gear rotatably mounted on the output shaft and in mesh with the first drive gear to provide a low speed gear train, a second driven gear mounted on the output shaft for rotation therewith and in mesh with the second drive gear to provide a high speed gear train. The ancillary change-speed mechanism includes an ancillary shaft arranged in parallel with the input shaft and rotatably mounted within the housing, an input gear rotatably mounted on the ancillary shaft and in mesh with the first drive gear, an output gear mounted on the ancillary shaft for rotation therewith and in mesh with the second drive gear, and a synchronizer mounted on the ancillary shaft to engage the input gear with the ancillary shaft.

5 Claims, 2 Drawing Figures

POWER TRANSMISSION WITH ANCILLARY CHANGE-SPEED MECHANISM FOR EXTRA-LOW-SPEED GEAR TRAIN

BACKGROUND OF THE INVENTION

1. Field of the Invention

The present invention relates to a power transmission for motor vehicles, and more particularly to a power transmission suitable for use in a four-wheel drive vehicle, which transmission is equipped with an ancillary change-speed mechanism for providing an extra-low-speed gear train the reduction gear ratio of which is larger than that of a first-speed gear train in a main change-speed mechanism.

2. Description of the Prior Art

In Japanese Patent Early Publication No. 59-133850, there has been proposed a power transmission as described above, which transmission comprises a main change-speed mechanism including an input shaft drivingly connected to a crankshaft of a prime mover of the vehicle, an output shaft arranged in parallel with the input shaft, and a plurality of change-speed gear trains provided on the input and output shafts to transmit the power from the input shaft to the output shaft at a selected reduction gear ratio, and an ancillary change-speed mechanism for providing an extra-low-speed gear train the reduction gear ratio of which is larger than that of the first-speed gear train in the main change-speed mechanism. The ancillary change-speed mechanism comprises a pair of ancillary shafts arranged in parallel with the input shaft, first and second idler gears each mounted on one of the ancillary shafts for rotation therewith, the first idler gear being in mesh (i.e. in Meshing engagement) with a drive gear on the input shaft, a third gear axially slidably mounted on the other ancillary shaft, a fourth gear mounted on the output shaft for rotation therewith, and clutch means arranged to shift the third gear for meshing engagement with the second idler gear and the fourth gear. In the power transmission, it is advantageous that the ancillary change-speed mechanism is arranged in parallel with the main change-speed mechanism without causing any increase in axial length of the power transmission. It is, however, disadvantageous that the ancillary change-speed mechanism is complicated in construction and of relatively large width due to the provision of such additional component parts as described above.

SUMMARY OF THE INVENTION

It is, therefore, a primary object of the present invention to provide an improved power transmission of this kind, wherein the component parts of the main change-speed mechanism are effectively utilized to provide the extra-low-speed gear train in a simple construction without causing any increase in width of the power transmission.

According to the present invention, the primary object is accomplished by providing a power transmission for a motor vehicle which comprises a housing assembled with a prime mover of the vehicle and being formed to contain a main change-speed mechanism and an ancillary change-speed mechanism. The main change-speed mechanism includes input and output shafts arranged in parallel with each other and rotatably mounted within the housing, a first drive gear integrally mounted on the input shaft for rotation therewith, a second drive gear rotatably mounted on the input shaft and being formed larger in diameter than the first drive gear, a first driven gear rotatably mounted on the output shaft and in mesh with the first drive gear to provide a low speed gear train, and a second driven gear integrally mounted on the output shaft for rotation therewith and being formed smaller in diameter than the first driven gear, the second driven gear being in mesh with the second drive gear to provide a high speed gear train. The ancillary change-speed mechanism includes an ancillary shaft arranged in parallel with the input shaft of the main change-speed mechanism and rotatably mounted within the housing, an input gear rotatably mounted on the ancillary shaft and in mesh with the first drive gear, an output gear integrally mounted on the ancillary shaft for rotation therewith and in mesh with the second driven gear, and an acillary synchronizer mounted on the ancillary shaft to establish synchronous engagement of the input gear with the ancillary shaft.

In a practical embodiment of the present invention, it is preferable that the input gear of the ancillary change-speed mechanism is formed larger in diameter than the first drive gear and the output gear is formed smaller in diameter than the input gear and smaller in diameter than the second driven gear.

BRIEF DESCRIPTION OF THE DRAWINGS

Additional objects, features and advantages of the present invention will become readily apparent from the following detailed description of a preferred embodiment thereof when taken together with the accompanying drawings, in which.

DETAILED DESCRIPTION OF THE PREFERRED EMBODIMENT

Figure 1:
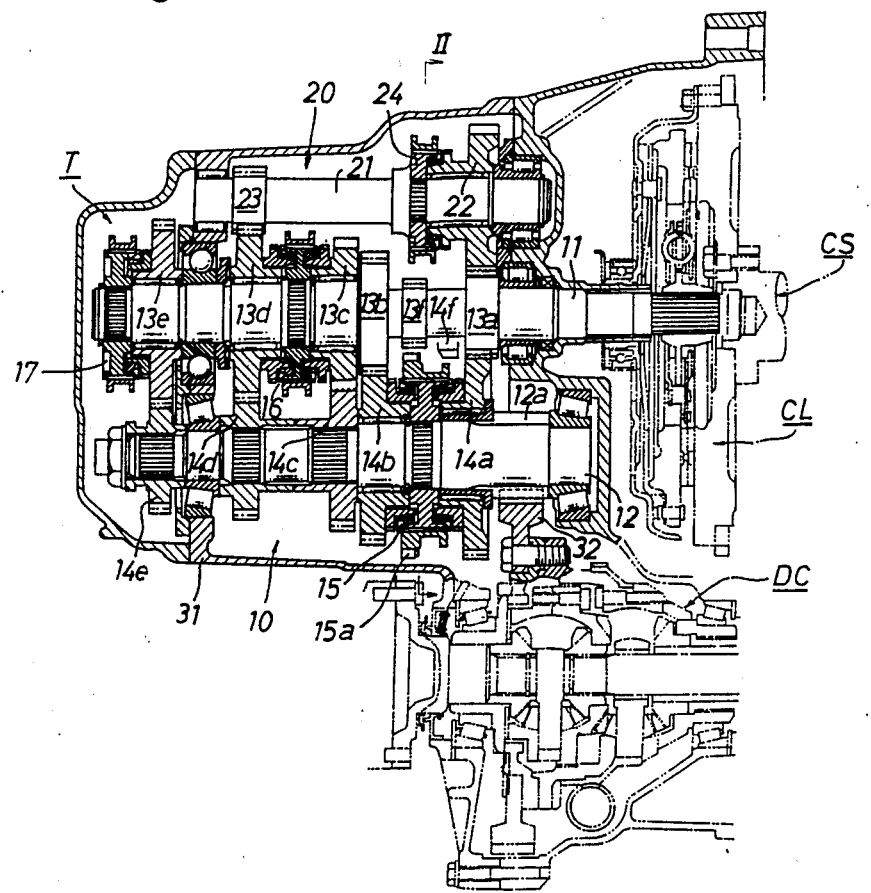
FIG. 1 is a sectional view of a power transmission in accordance with the present invention.

Referring now to the drawings, FIG. 1 illustrates a manual power transmission T adapted for use in a four-wheel drive vehicle. The power transmission T is assembled with a prime mover (not shown) of the vehicle and drivingly connected to a crankshaft CS of the prime mover through a clutch mechanism CL to transfer the power to a center differential DC at a selected gear ratio. The center differential DC is arranged to transfer the power to a pair of front wheel drive axles and a pair of rear wheel drive axles therethrough. The power transmission T comprises a main change-speed mechanism 10 and an ancillary change-speed mechanism 20 contained within a trans-axle housing 31.

The main change-speed mechanism 10 includes an input shaft 11 rotatably mounted within housing 31 and drivingly connected to crankshaft CS of the prime mover, an output shaft 12 arranged in parallel with input shaft 11 and rotatably mounted within housing 31, and a plurality of change-speed gear trains provided on input and output shafts 11 and 12 for establishing a drive power train selectively at five forward gear ratios and one reverse gear ratio. In this embodiment, the change-speed gear trains are composed of first-speed to fifth-speed gear trains and a reverse gear train as described hereinafter. The first-speed gear train consists of a first drive gear 13a integrally mounted on input shaft 11 for rotation therewith, and a first driven gear 14a rotatably mounted on output shaft 12 and in mesh with the first drive gear 13a. The second-speed gear train consists of a second drive gear 13b integrally mounted on input shaft 11 for rotation therewith, and a second driven gear 14b rotatably mounted on output shaft 12 and in mesh with the second drive gear 13b. The second drive gear 13b is formed so as to be larger in diameter than the first drive gear 13a, while the second driven gear 14b is formed so as to be smaller in diameter than the first driven gear 14a. A first synchronizer 15 is mounted on output shaft 12 to selectively establish synchronous engagement of first driven gear 14a or second driven gear 14b with output shaft 12.

The third-speed gear train consists of a third drive gear 13c rotatably mounted on input shaft 11, and a third driven gear 14c splined to output shaft 12 for rotation therewith and in mesh with the third drive gear 13c. The third drive gear 13c is formed larger in diameter than the second drive gear 13b, while the third driven gear 14c is formed so as to be smaller in diameter than the second driven gear 14b. The fourth-speed gear train consists of a fourth drive gear 13d rotatably mounted on input shaft 11, and a fourth driven gear 14d splined to output shaft 12 for rotation therewith and in mesh with the fourth drive gear 13d. The fourth drive gear 13d is formed so as to be larger in diameter than the third drive gear 13c, while the fourth driven gear 14d is formed so as to be smaller in diameter than the third driven gear 14c. A second synchronizer 16 is mounted on input shaft 11 to selectively establish synchronous engagement of third drive gear 13c or fourth drive gear 13d with input shaft 11.

Figure 2:
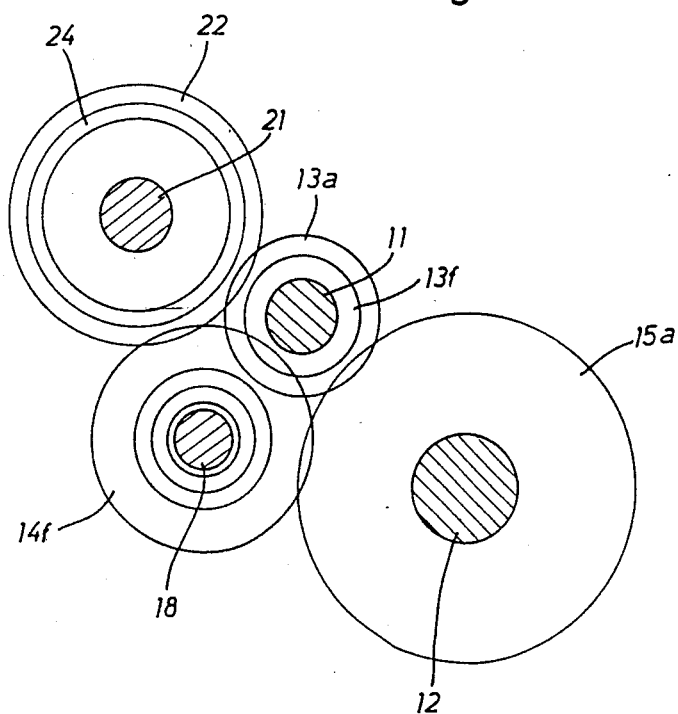
FIG. 2 is a schematic illustration taken along line II—II in FIG. 1, showing intermeshed gear in the power transmission.

The fifth-speed gear train consists of a fifth drive gear 13e rotatably mounted on input shaft 11, and a fifth driven gear 14e splined to output shaft 12 for rotation therewith and in mesh with the fifth drive gear 13e. The fifth drive gear 13e is formed so as to be larger in diameter than the fourth drive gear 13d, while the fifth driven gear 14e is formed so as to be smaller in diameter than the fourth driven gear 14d. A third synchronizer 17 is mounted on input shaft to establish synchronous engagement of fifth drive gear 13e with input shaft 11. In addition, the reverse gear train consists of a reverse drive gear 13f integrally provided on input shaft 11 for rotation therewith, a reverse driven gear 15a integrally formed on a clutch sleeve of the first synchronizer 15, and a reverse idler gear 14f rotatably and axially slidably mounted on a reverse idler shaft 18 as shown in FIG. 2. The reverse idler shaft 18 is arranged in parallel with input and output shafts 11, 12 and fixedly mounted within housing 31. The reverse idler gear 14f is arranged to be brought into meshing engagement with reverse drive gear 13f and reverse driven gear 15a for establishing a reverse drive power train. The output shaft 12 is integrally provided thereon with an output gear 12a which is in mesh with a ring gear 32 integral with the center differential DC.

The ancillary change-speed mechanism 20 comprises an ancillary shaft 21 arranged in parallel with input shaft 11 and rotatably mounted within housing 31, an input gear 22 rotatably mounted on ancillary shaft 21 and in mesh with the first drive gear 13a, an output gear 23 integrally provided on ancillary shaft 21 for rotation therewith and in mesh with the fourth drive gear 13d, and an ancillary synchronizer 24 mounted on shaft 21 to selectively establish synchronous engagement of input gear 22 with ancillary shaft 21. The input gear 22 is formed so as to be larger in diameter than the first drive gear 13a, while the output gear 23 is formed smaller in diameter than the input gear 22 and smaller in diameter than the fourth drive gear 13d.

Assuming that in operation of the power transmission T, the input gear 22 is being disengaged from ancillary shaft 21 as shown in FIG. 1, the ancillary change-speed mechanism 20 is in an inoperative condition, and the main change-speed mechanism 10 is operated in a usual manner to selectively establish a forward drive power train at a selected gear ratio or a reverse drive power train. When the ancillary synchronizer 24 is shifted to effect synchronous engagement of input gear 22 with ancillary shaft 21, the output gear 23 is driven by the power applied thereto from input shaft 11 through input gear 22 and ancillary shaft 21 to rotate the fourth drive gear 13d, and in turn, the fourth driven gear 14d is driven by drive gear 13d to rotate the output shaft 12. Thus, the power from input shaft 11 is transmitted to the output shaft 12 at a reduction gear ratio larger than that of the first-speed gear train in the main change-speed mechanism 10.

With the foregoing arrangement of input and output gears 22, 23 on ancillary shaft 21, the ancillary change-speed mechanism 20 can be assembled in parallel with the main change-speed mechanism 10 without causing any increase in axial length of the power transmission unit T. Furthermore, the first and fourth drive gears 13a, 13d of main change-speed mechanism 10 can be effectively utilized to provide the ancillary change-speed mechanism 20 with a simple construction without causing any increase in width of the power transmission unit T.

Although in the embodiment described herein, the input and output gears 22, 23 of ancillary change-speed mechanism 20 have been arranged in mesh with the first and fourth drive gears 13a, 13d of main change-speed mechanism 10, the output gear 23 may be arranged in mesh with third drive gear 13c or fifth drive gear 13e to obtain a reduction gear ratio larger than that of the first-speed gear train. Alternatively, the input gear 22 may be arranged in mesh with reverse drive gear 13f, while the output gear 23 may be arranged in mesh with either third drive gear 13c, fourth drive gear 13d or fifth drive gear 13e.

Having now fully set forth both structure and operation of a preferred embodiment of the concept underlying the present invention, various other embodiments as well as certain variations and modifications of the embodiment herein shown and described will obviously occur to those skilled in the art becoming familar with said underlying concept. It is to be understood, therefore, that within the scope of the appended claims, the invention may be practiced otherwise than as specifically set forth herein.

What is claimed is:

1. A power transmission for a motor vehicle comprising a housing formed to contain a main change-speed mechanism and an ancillary change-speed mechanism, said main change-speed mechanism including an input shaft rotatably mounted within said housing and drivingly connected to an output shaft of a prime mover of the vehicle, an output shaft arranged in parallel with said input shaft and rotatably mounted within said housing, a first drive gear integrally mounted on said input shaft for rotation therewith, a second drive gear rotatably mounted on said input shaft and being formed so as to be larger in diameter than said first drive gear, a first driven gear rotatably mounted on said output shaft and in meshing engagement with said first drive gear to provide a low speed gear train, and a second driven gear integrally mounted on said output shaft for rotation therewith and being formed so as to be smaller in diameter than said first driven gear, said second driven gear being in meshing engagement with said second drive gear to provide a high speed gear train, wherein said ancillary change-speed mechanism comprises an ancillary shaft arranged in parallel with said input shaft of said main change-speed mechanism and rotatably mounted within said housing, an input gear rotatably mounted on said ancillary shaft and in meshing engagement with said first drive gear, said input gear being formed so as to be larger in diameter than said first drive gear, an output gear integrally mounted on said ancillary shaft for rotation therewith and in meshing engagement with said second drive gear, and clutch means mounted on said ancillary shaft to engage said input gear with said ancillary shaft.

2. A power transmission as claimed in claim 1, wherein said output gear of said ancillary change-speed mechanism is formed so as to be smaller in diameter than said input gear.

3. A power transmission as claimed in claim 1, wherein said clutch means is in the form of an ancillary synchronizer mounted on said ancillary shaft to establish synchronous engagement of said input gear with said ancillary shaft.

4. A power transmission for a motor vehicle comprising a housing assembled with a prime mover of the vehicle and being formed to contain a main change-speed mechanism and an ancillary change-speed mechanism, said main change-speed mechanism including first and second drive gears each integrally mounted on said input shaft for rotation therewith, third and fourth drive gears rotatably mounted on said input shaft, first and second driven gears rotatably mounted on said output shaft and in meshing engagement with said first and second drive gears respectively to provide a first-speed gear train and a second-speed gear train, and third and fourth driven gears integrally mounted on said output shaft for rotation therewith and in meshing engagement with said third and fourth drive gears respectively to provide a third-speed gear train and a fourth-speed gear train, wherein said ancillary change-speed mechanism comprises an ancillary shaft arranged in parallel with said input shaft of said main change-speed mechanism and rotatably mounted within said housing, an input gear rotatably mounted on said ancillary shaft and in meshing engagement with one of said first and second drive gears, said input gear being formed so as to be larger in diameter than said one of said first and second drive gears, an output gear integrally mounted on said ancillary shaft for rotation therewith and in meshing engagement with one of said third and fourth drive gears, and clutch means mounted on said ancillary shaft to engage said input gear with said ancillary shaft.

5. A power transmission as claimed in claim 4, wherein said output gear of said ancillary change-speed mechanism is formed so as to be smaller in diameter than said input gear and smaller in diameter than one of said third and fourth drive gears.

* * * * *